United States Patent [19]

Linner

[11] Patent Number: 5,323,589
[45] Date of Patent: Jun. 28, 1994

[54] METHOD END AND APPARATUS FOR PRODUCING A PRODUCT-FILLED CONTAINER

[75] Inventor: Hans Linner, Kalmar, Sweden

[73] Assignee: Norden Pac Development AB, Sweden

[21] Appl. No.: 916,855

[22] PCT Filed: Feb. 20, 1991

[86] PCT No.: PCT/SE91/00121
§ 371 Date: Aug. 6, 1992
§ 102(e) Date: Aug. 6, 1992

[87] PCT Pub. No.: WO91/14623
PCT Pub. Date: Oct. 3, 1991

[30] Foreign Application Priority Data

Mar. 26, 1990 [SE] Sweden .............................. 9001086-9

[51] Int. Cl.⁵ .................... B65B 31/02; B65B 3/04; B65B 7/28; B65B 51/20
[52] U.S. Cl. ........................... 53/432; 53/433; 53/471; 53/478; 53/281; 53/510; 53/511; 53/329.2; 53/373.9
[58] Field of Search ............... 53/432, 471, 433, 478, 53/510, 511, 281, 329.2, 329.3, 88, 373.9; 156/69

[56] References Cited

U.S. PATENT DOCUMENTS 2,903,832 9/1959 Graff et al. .

FOREIGN PATENT DOCUMENTS 3744402 7/1989 Fed. Rep. of Germany .
8704048 4/1989 Sweden .
8800548 8/1989 Sweden . .
5992 of 1904 United Kingdom .

Primary Examiner—Horace M. Culver
Attorney, Agent, or Firm—Lerner, David, Littenberg, Krumholz & Mentlik

[57] ABSTRACT

A method for manufacturing a container filled with a product is disclosed. The container has a substantially tubular body portion of thin-walled plastic or laminated plastic material and a butt-weldable end-piece at each end of the body portion. A first end-piece is fitted to one end of the body portion and the product is introduced into the container via the open end of the body portion, a second end-piece 13 is introduced into the open body portion end to an intermediate position at which it partially projects into the body portion, and the plastic material of the body portion end region and the second end-piece is softened through application of heat energy. The end-piece by means of relative displacement between it and the body portion, is pressed into the body portion to its terminal position during evacuation of air from the interior of the container via an opening in the end-piece and the opening is thereafter heat-sealed.

13 Claims, 3 Drawing Sheets

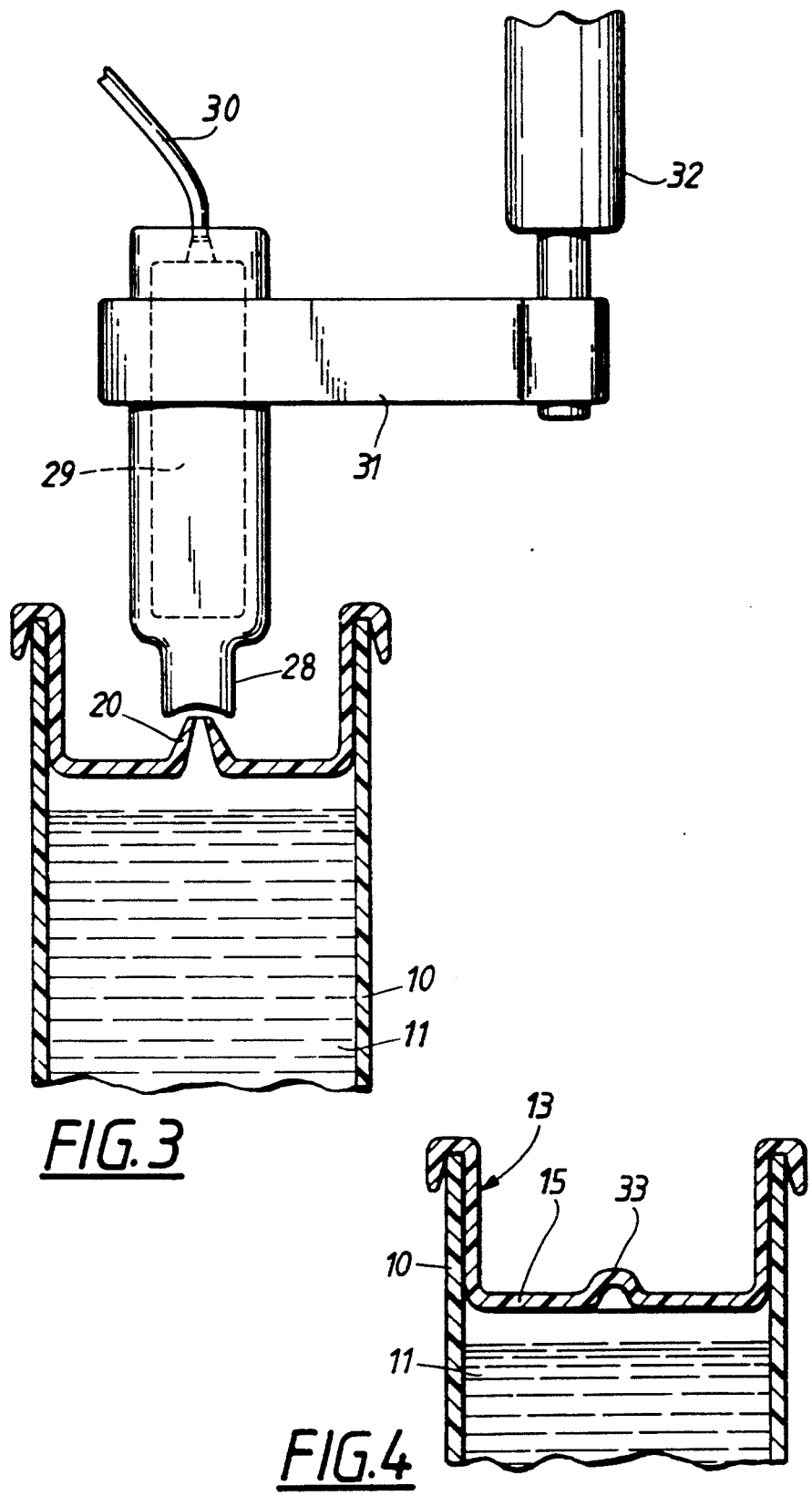

5,323,589

METHOD END AND APPARATUS FOR PRODUCING A PRODUCT-FILLED CONTAINER

TECHNICAL FIELD

The present invention relates to a method, end-piece and apparatus for producing a product-filled container, the container comprising a substantially tubular body portion of thin-walled plastic or laminated plastic material, a first butt-weldable end-piece at a first end of the body portion and a second butt-weldable end-piece at a second end of the body portion.

BACKGROUND

Tubes and bottles made from thin-walled plastic or plastic laminated material are used for packaging of, for example, creams, ointments and various other viscous chemical/engineering preparations. Swedish Patent Application 8800548-3 describes an end-piece and a method for manufacturing tubes or bottles by butt-welding an end-piece in both ends of a tubular-shaped body portion of thin-walled plastic or laminated plastic material.

The advantage of manufacturing tubes or bottles in this way is that the need to transport bulky empty containers over long distances is avoided. Accordingly the method allows the private packager to produce his own tubes or bottles without comprehensive equipment.

The tube or bottle produced according to the above method can be filled with its product via its opening, after which a cap is affixed over the opening with the aid of, for example, screw threads.

In many cases, however, it is desirable to provide a container which has been sealed in a controlled environment so that the customer can confirm that the packaging is unopened. This results in enhanced quality, both for the packaging and its contents.

During production of such a sealed container it is advantageous that filling with the product occurs between the fitting of the first end-piece, preferably tubularly formed, and the second end-piece. It has, however, proven to be difficult to fit the second end-piece without the product in the body-portion open end fouling either the weld-seam or the sealing region. A contributory factor to this problem is, of course, the high production rate which can reach around two units per second.

It is possible to avoid this problem by increasing the so-called "head-space" volume between the product and the inner surface of the end-piece. This can, however, lead to negative consequences for the product if there is the risk that it can react with the air in the said head-space. Furthermore, the customer may discriminate against a container with a large head space volume since it does not appear to be completely full.

SUMMARY OF THE INVENTION

The object of the present invention is thus to provide a method and a device which permits the production of full containers at a high rate and with minimal head-space volume.

This object is achieved in accordance with the present invention by a method for manufacturing a container filled with a product, the container comprising a substantially tubular body portion of thin-waled plastic or laminated plastic material, a first butt-weldable end-piece at a first end of the body portion and a second butt-weldable end-piece at a second end of the body portion, the method comprising:

fitting said first end-piece to said first end of the body portion;

introducing the product into the container via said second end of the body portion;

introducing said second end-piece into said second end of the body portion to an intermediate position at which the second end-piece partially projects into the body portion, softening the plastic material of an end region of the body portion and the second end-piece through application of heat energy;

pressing the second end-piece into the body portion to a terminal position by means of relative displacement between the second end-piece and the body portion during evacuation of air from within the container via an opening in the second end-piece; and heat-sealing said opening.

The invention also provides a device for butt-welding an end-piece having a substantially cylindrical wall region to a substantially tubular body portion of thin-walled plastic or laminated plastic material to form a container, said device comprising:

application means for placing said end-piece in a defined intermediate position, partially projecting into an end of the tubular body portion;

heating means for supplying warm gas to soften the plastic material of a weld region of the body portion and a region or regions of an outwardly projecting portion of the end-piece;

means for displacing the body portion and the end-piece relative to each other until the end-piece is in its terminal position in the body portion; and suction means for evacuating utilized warm air from the weld region and excess air from the container via an evacuation nipple in the end-piece.

Further advantageous embodiments are detailed in the respective dependent claims.

BRIEF DESCRIPTION OF THE DRAWINGS

The invention will be described in more detail in the following, with reference to the drawings in which FIGS. 1 and 2 schematically show the application of an end-piece to a tubular body portion in two steps with a device according to the invention, FIG. 3 shows the sealing of an evacuation opening in the end-piece, FIG. 4 shows the end-piece after said sealing.

DETAILED DESCRIPTION OF THE PREFERRED EMBODIMENT

Figure 2:
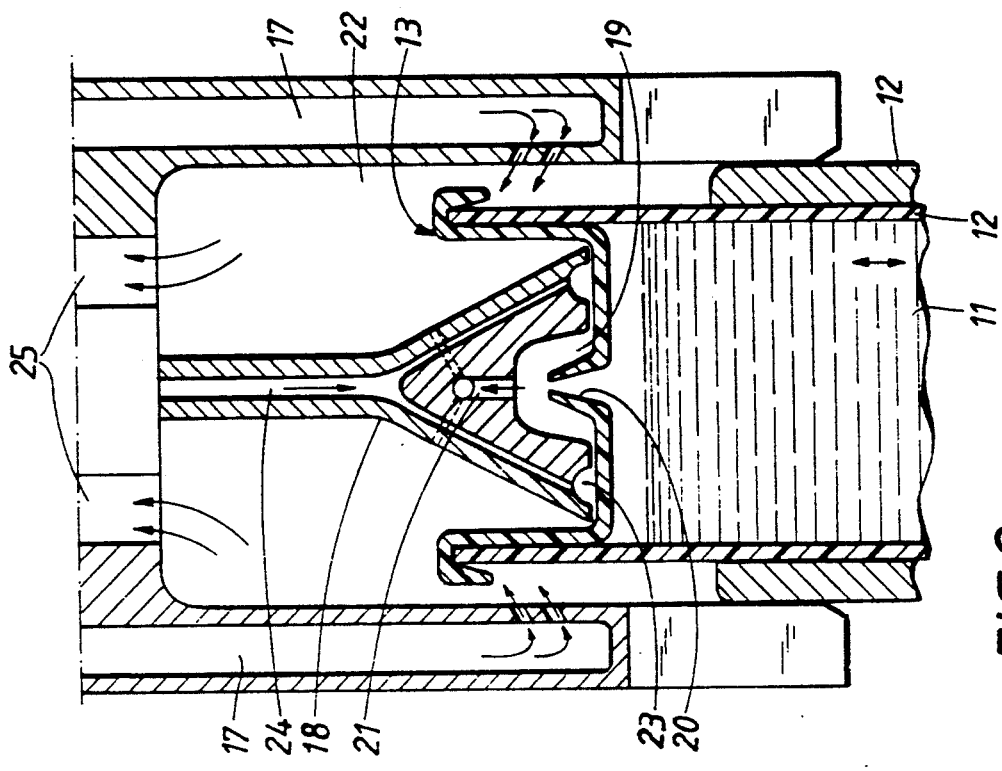

The flattenable tubular body portion 10 shown in the drawings can be made from a single-layer plastic material or from a laminate comprising a metal foil which provides the body portion with better barrier properties. The body portion can be produced by a foil butt-seam welder or, alternatively, from an extruded tube, cut to the appropriate length Such body portions normally have a wall thickness well under 1 mm.

In the drawings only the upper end of the body portion is shown. The lower part of the body portion is already fitted with an end-piece in the form of, for example, a discharge outlet with cooperating screw cap. The body portion is filled via its open end with a product 11 to a predetermined level which corresponds to the desired quantity for the container. The body portion is now placed vertically with the opening upwards in a cylindrical holder 12 in a (not shown) rotary indexing table which is provided with means for fitting the end-piece in the following sequence of steps.

Figure 1:
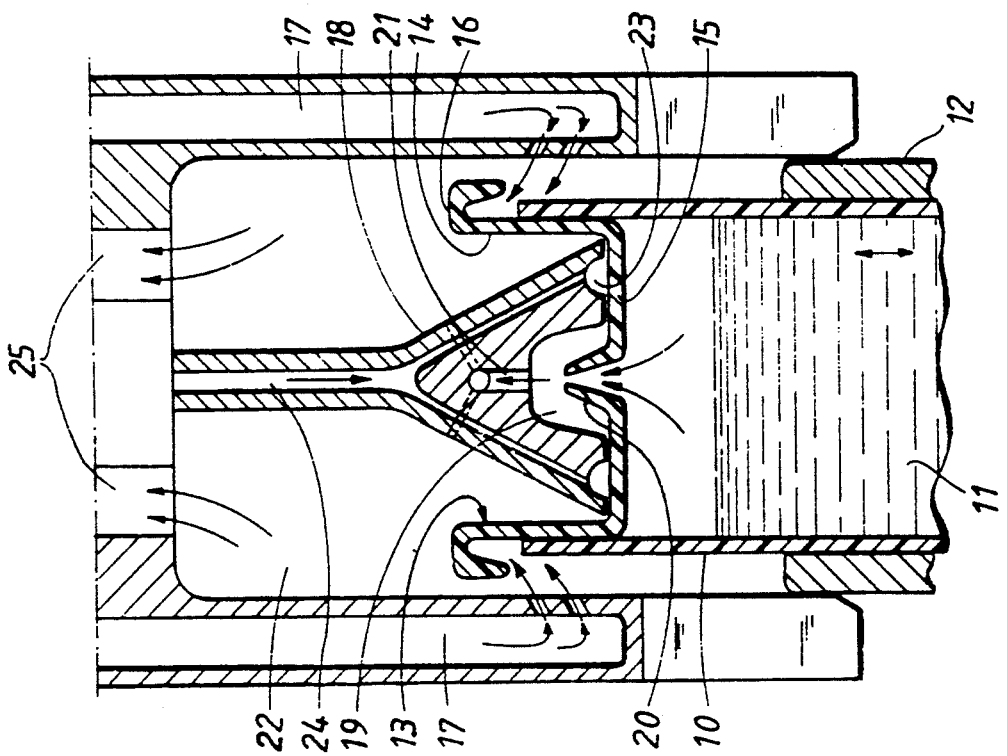

In FIG. 1 the end-piece 13 has been partially introduced into the upwardly open body portion end and then advanced one stage to the welding station shown in FIGS. 1 and 2.

The end-piece 13 comprises an insert section 14 which, on the inner end, is provided with a transverse wall 15 and, on the other end, is provided by a U-shaped section 16. The insert section 14 tapers inwardly towards the transverse wall 15. The U-shaped section is provided with a groove that tapers towards the bottom of the U-shaped section.

The end-piece can, by way of example, be produced by injection-molding, whereby a barrier foil blank may be included on the inner side or the outer side of the transverse wall 15.

The welding station is provided with passages 17 for supplying hot gas via directed openings to the region of the body portion end edge and to the groove in the U-shaped section 16 in order to soften these regions by application of heat to a temperature between about 300°-500° C. After suitable heating, the holder 12 is displaced upwardly in the welding apparatus so that the end-piece 13 is pressed into the tubular body portion until the rim of the body portion meets with the bottom of the groove, as shown in FIG. 2. A central nozzle head 18 serves as an abutment for the endpiece 13.

The nozzle head 18 is formed with a substantially flat underside which is provided with a central recess 19, intended to receive with generous clearance an evacuation nipple 20 centrally located on the end-piece's transverse wall. The nipple 20 permits the evacuation of air from the head-space between the product 11 and the end wall 15 when the end-piece is pressed into the body portion end. For this purpose the recess 19 is equipped with a branch conduit 21 which exits into a space 22 surrounding the nozzle head 18.

In a preferred embodiment of the invention the underside of the nozzle head 18 is also provided with a groove 23 which extends circumferentially above the perimeter of the transverse wall 15. A branch conduit 24 for the supply of cooling gas opens into the groove 23 and accordingly distributes cooling gas around the perimeter of the transverse wall 15. In this way the transverse wall is cooled without affecting the heating of the overlapping wall region of the body portion via the passages 17. Such a cooling means is described and claimed in our co-pending application "Method and Apparatus for controlling the temperature of a container end portion during manufacture".

A suitable cooling gas can be cold air. Expended cold air flows from the groove 23 via the underside of the nozzle head to the surrounding space 22 from where the utilized cold air and hot gas is drawn from the welding station via passages 25. Since the recess 19 accommodates the evacuation nipple 20 with generous clearance, there is no risk of any quantity of the viscous product being sucked out through the nipple.

Figure 5:
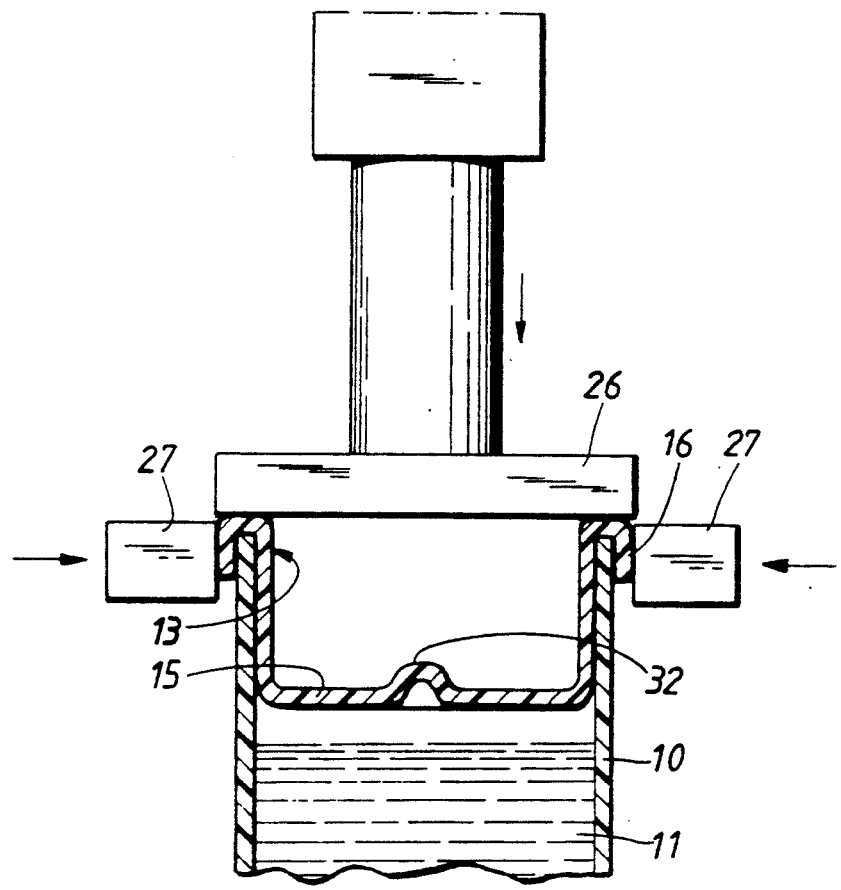
FIG. 5 shows the compression of the weld-seam.

FIG. 5 shows the subsequent step of compressing the U-shaped section 16 whilst still soft so that a seal in this region is achieved. Compression can be carried out by a vertically displaceable abutment 26 and a plurality of horizontal compression devices 27. These compression devices may be mechanically or elastic-hydraulically operable.

FIGS. 3 and 4 show how the evacuation nipple is sealed by means of a vertically displaceable heated mandrel 28 which is provided with a heating element 29 connected via a cable 30 to an electrical source. The heated mandrel 28 is mounted on an arm 31, vertically displaceable via a piston cylinder 32. As is shown in FIG. 4, the evacuation nipple is thus transformed into a closed nipple 33.

The invention is not restricted to the above described embodiments, but may be modified within the scope of the appended claims.

I claim:

1. A method for manufacturing a container filled with a product, the container comprising a substantially tubular body portion of thin-walled plastic or laminated plastic material, a first butt-weldable end-piece at a first end of the body portion and a second butt-weldable end-piece at a second end of the body portion, the method comprising:

fitting said first end-piece to said first end of the body portion;

introducing the product into the container via said second end of the body portion;

introducing said second end-piece into said second end of the body portion to an intermediate position at which the second end-piece partially projects into the body portion, softening the plastic material of an end region of the body portion and the second end-piece through application of heat energy;

pressing the second end-piece into the body portion to a terminal position by means of relative displacement between the second end-piece and the body portion during evacuation of air from within the container via an opening in the second end-piece; and heat-sealing said opening.

2. The method as claimed in claim 1, wherein the heat energy is provided by a hot gas.

3. The method as claimed in claim 1 or 2, wherein the weld seams between the tubular body portion and the second end-piece are subjected to pinching together.

4. The method as claimed in claim 2, wherein during the introduction of said second end-piece into the body portion a quantity of cooling gas is provided to a region of said second end-piece adjacent the product.

5. A method for manufacturing a container filled with a product, the container comprising a substantially tubular body portion of thin-walled plastic or laminated plastic material having a first end and a second end, and a butt-weldable end-piece at said first end of said body portion, the method comprising the steps of:

fitting said butt-weldable end-piece to said first end of said body portion;

placing the product into the container through said first end of said body portion;

placing said butt-weldable end-piece adjacent said first end of said body portion;

applying heat to at least a portion of said butt-weldable end-piece to soften the plastic material thereof;

evacuating air present within the container between the product placed therein and said butt-weldable end-piece through an opening in said butt-weldable end-piece;

pressing said butt-weldable end-piece into said body portion to a terminal position between said first end and said second end thereof by means of relative displacement between said butt-weldable end-piece and said body portion during said evacuation of air through the opening in said butt-weldable end-piece; and applying heat to the opening in said butt-weldable end-piece to seal the opening.

6. The method of claim 5 wherein said heat applied during said step of applying heat to at least a portion of said butt-weldable end-piece to soften the plastic material thereof, is a hot gas.

7. The method of claim 5 wherein said step of placing said butt-weldable end-piece adjacent said first end of said body portion further comprises the step of placing said butt-weldable end-piece at least partially within said body portion to an intermediate position between said first end and said second end thereof.

8. The method of claim 7 further comprising the step of providing a quantity of cooling gas to at least a portion of said butt-weldable end-piece during placement of said butt-weldable end-piece to the terminal position within said body portion.

9. A device for butt-welding an end-piece having a substantially cylindrical wall region to a substantially tubular body portion of thin-walled plastic or laminated plastic material to form a container, said device comprising:

application means for placing said end-piece in a defined intermediate position, partially projecting into an end of the tubular body portion;

heating means for supplying warm gas to soften the plastic material of a weld region of the body portion and a region or regions of an outwardly projecting portion of the end-piece;

means for displacing the body portion and the end-piece relative to each other until the end-piece is in its terminal position in the body portion; and suction means for evacuating utilized warm air from the weld region and excess air from the container via an evacuation nipple in the end-piece.

10. The device as claimed in claim 9, wherein means are provided for supplying a cooling gas to an end wall of the end-piece.

11. The device as claimed in claim 10, wherein the suction means is adapted to remove utilized cooling gas from the end wall.

12. The device as claimed in claim 10 or 11, wherein the means for supplying cooling gas to the end wall and the suction means form an integral component for introducing the end-piece into the end of the body portion.

13. The device as claimed in claim 10, wherein the means for supplying cooling gas opens into a ring-shaped groove which runs above and substantially around a perimeter of the end wall.

* * * * *